United States Patent Office 3,130,033
Patented Apr. 21, 1964

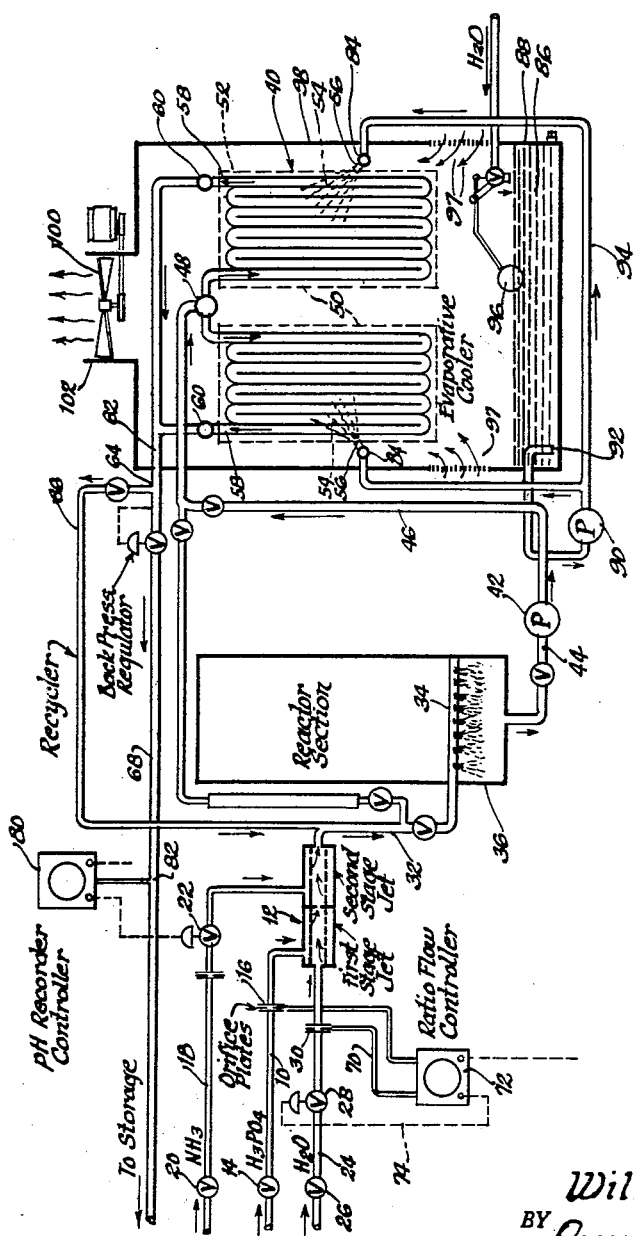

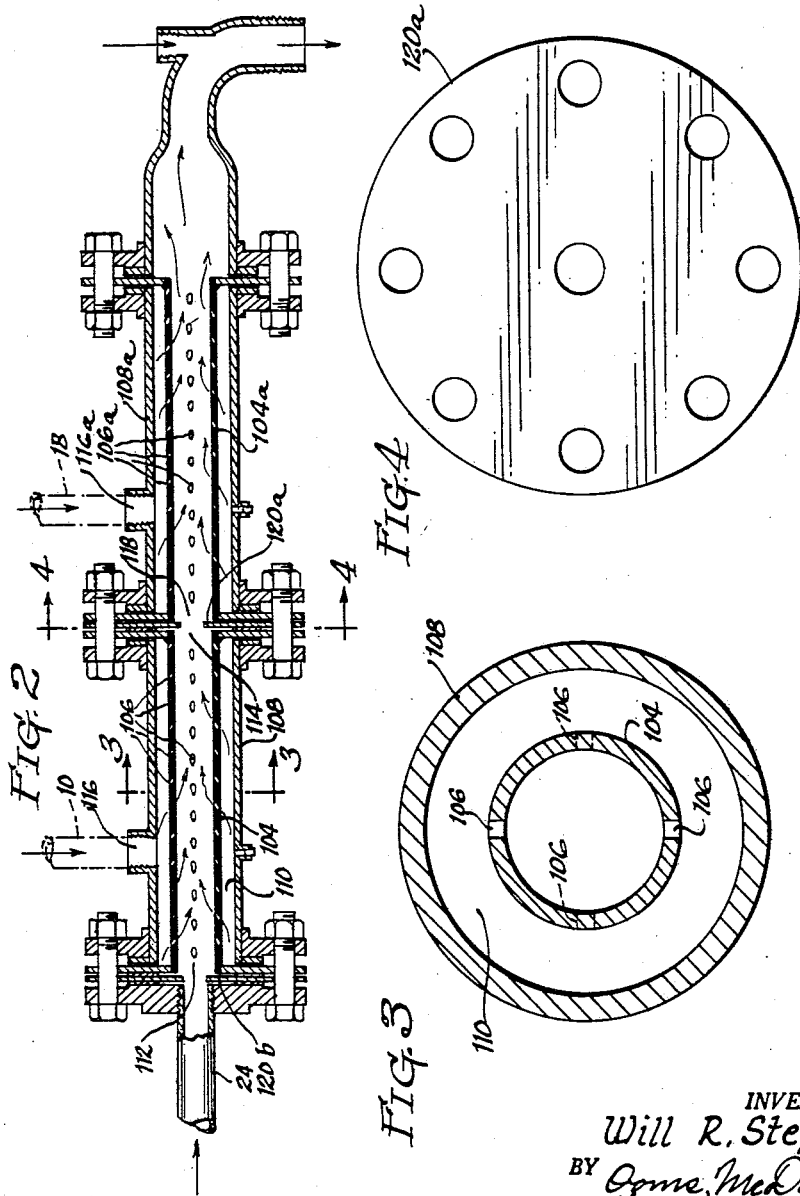

3,130,033
METHOD OF PRODUCING A MIXED LIQUID FERTILIZER CONTAINING NITROGEN AND PHOSPHORUS
Will R. Stephens, Cedar Rapids, Iowa, assignor to Barnard & Leas Manufacturing Company, Inc., Cedar Rapids, Iowa
Original application Nov. 28, 1956, Ser. No. 624,840, now Patent No. 2,977,201, dated Mar. 28, 1961. Divided and this application Aug. 30, 1960, Ser. No. 52,974
11 Claims. (Cl. 71—1)

This invention relates broadly to the admixture of fluid components under controlled conditions for combination or reaction and to a system or apparatus capable of use in continuous operation for the preparation of a desired fluid product in an efficient and economical manner.

More specifically, it relates to the preparation of a mixed liquid fertilizer by admixture of the various components from solutions in a continuous operation thereby to enable manufacture at low cost and at separated stations for local distribution.

This application is a division of application Ser. No. 624,840, filed November 28, 1956, now Patent No. 2,977,201, patented March 28, 1961, entitled "Method and Apparatus for Producing Liquid Reaction Products."

While various concepts of this invention have application to the admixture of any two or more fluids for combination or reaction, the concepts of this invention are of particular interest in the preparation of a liquid fertilizer system, such as aqueous ammonia, or preferably mixed fertilizers formed of ammonia and phosphoric acid present in combination in the desired ratio to produce a new and improved neutral fertilizer and which may be diluted with water to a desired concentration for local distribution and use. As a result, the inventive concepts which will hereinafter be described will have application particularly to a system for the manufacture of a mixed liquid fertilizer but it will be understood that many of the concepts that will hereinafter be described can be employed equally well for the combination or reaction of other components in a liquid state to produce a desired finished product.

On practically every piece of land throughout the world which is tilled for agricultural or growing purposes, use is made of a fertilizer to supplement the elements found to be desirable in the earth for best use in the growth of various products. In this way, pieces of land are reclaimed for agricultural purposes while other pieces of land are improved or retained in a desirable condition for maximum yield of grown products. For the most part, use has been made of a dry mixture containing the various elements in the form of compounds from which the elements can be released by reactions that take place in the soil. Such dry fertilizer mixtures are fairly expensive from the standpoint of the materials of which they are formed, their admixture one with the other for uniform distribution of the compounds, and from the standpoint of the cost for transportation from the source of manufacture to distant points of use. In addition, the elements in the dry fertilizer intended to be made available in the soil are tied into their respective compounds in a manner which often resists immediate release. As a result, dry fertilizers are generally considered to be slow acting in the release of their components for supplementing the elements necessary for plant growth.

More recently liquid fertilizers have been developed for use in place of dry fertilizer mixtures for enrichment of the soil. When applied as a liquid fertilizer, the elements present in solution in the composition are made almost immediately available in the soil for utilization in growth. In addition, the liquid fertilizer systems are more easily spread as by spraying or sprinkling over the soil thereby to enable the use of less expensive equipment and less time. Because uniform distribution is a characteristic of liquid systems, preparation of the liquid fertilizer for distribution can be made without the extensive equipment required for mixing, blending and packaging the dry fertilizers and with the result that formulation can be effected at stations from which local distribution can be made without the necessity to transport substantial components of the fertilizer mixture, such as water. These all lead to the greater acceptability which is being enjoyed by liquid systems as compared to dry mixtures for fertilizing the soil.

To the present, liquid fertilizer systems have been formulated primarily on a batch principle wherein each of the components have been weighed into a mixing tank from storage containers with the result that a large inventory in materials, equipment and space is required for the storage of the raw materials, for the batch mixing of the raw materials, and for the storage of finished product for distribution. In addition, the number of units is proportionately increased by the number of formulations which are prepared containing various ratios of nitrogen, phosphorus and the like, and various concentrations thereof. As a result, the investment in materials and equipment has indirectly been reflected in the cost of liquid fertilizers with the result that dry fertilizer systems have remained competitive and, in some instances, the dry fertilizer mixtures have even enjoyed an economical advantage over liquid fertilizers.

Further, liquid fertilizer systems which have heretofore been produced have been acidic in character because of the necessity to incorporate the phosphorus as phosphoric acid in substantial amounts. Such acidic systems lead to serious corrosion problems in the equipment processing the fertilizer and in handling the fertilizer further to interfere with the wide-spread acceptance of liquid materials as a replacement for the dry mix fertilizers.

It has been found still further that unless a fairly pure grade of phosphoric acid is employed for admixture and reaction with ammonia in the manufacture of ammonium phosphate, the impurities present in the acid tend to form insoluble products that settle out of the solution and interfere with the flow of the wet mix and in the uniformity of the composition thereof. Such pure acids of furnace grade are not only more expensive than the less pure red oil grade but the impurities in red oil have been found to be beneficial to the soil. As a result, while the lower cost acid would be more desirable from a nutrient as well as from a cost standpoint, the difficulties resulting from separation in use have necessitated the use of the less desirable and more expensive materials. These further lend to the advantage of the dry mix fertilizers over liquid systems.

It is an object of this invention to provide a method and apparatus for overcoming the many disadvantages and limitations heretofore encountered in liquid fertilizer systems and to make liquid fertilizers readily available at lower cost to the user and to make available an improved liquid fertilizer which is competitive, if not more desirable, from the standpoint of cost and composition by comparison with the dry mix fertilizers.

In general, it is an object of this invention to provide a method and apparatus for bringing together various liquids containing chemicals in solution for diffusion, combination or reaction and it is a related object to effect the desired diffusion, combination or reaction with components containing one or more vaporizing compounds to produce a stable product without the dangers characteristic of the formation of volatilizable materials.

Another object is to provide a method and apparatus whereby various chemical solutions can be processed through various operations from the supply to the final product in condition for storage or distribution including the removal, measurement, diffusion, reaction, and distribution or storage, without exposure of the operating personnel to contact with the various materials and mixtures, and it is a related object to carry out the combination of steps for such processing with accuracy that is required to produce an acceptable finished product.

It is an object to provide a means of the type described for processing various chemical liquids from their respective sources of supply including accurate measurement, diffusion, reaction and storage, in a continuous operation whereby the need for storage facilities for the raw materials and for the finished product can be reduced to a minimum and whereby the process can be carried out in various locations where the largest proportion of materials can be made available at low cost for local distribution directly to the user.

A still further object is to provide a means for the safe and efficient combination of materials which react exothermically and which operates automatically to control such combination to produce a neutral system that avoids the objectionable characteristics of corrosion such as prevailed in wet mix fertilizer systems heretofore formulated of ammonia compounds and phosphoric acid.

A still further object is to provide a means and apparatus of the type described which is capable of continuous operation for combining various materials in solution and which is of such simplicity in construction and operation as to enable transportation for use at various stations thereby to make the processing equipment available for use at the source for supply of the bulkier materials and which enables location of the equipment adjacent the means for making available the less bulky materials which are shipped in, such for example as adjacent the highway or trackage for receiving the ammonia or phosphoric acid or the like chemicals thereby materially to reduce the cost to the consumer.

Another object is to provide a means for effecting diffusion of fertilizable chemicals in solution without enabling gas or vapor formation or the development of other conditions which might lead to explosion or danger and it is a related object to provide a means of the type described for causing diffusion or reaction in a manner to produce a new and improved product from which separation characteristic of other means for admixture for combination is avoided.

More specifically, it is an object of this invention to provide a low cost and easily transportable mechanism as a unit operation to produce neutral chemical fertilizers near the area of use and in a form immediately available to plants as a nutrient and which will not injure them upon contact.

It is a further specific object to provide a unit mechanism of the type described for converting potent chemicals into a neutral liquid fertilizer of a controlled and predetermined chemical content in conformity with standard agricultural chemistry formulae, and which can be universally applied with inexpensive equipment by farmers or other nonspecialized personnel.

These and other objects and advantages of this invention will hereinafter appear and for purposes of illustration, but not of limitation, an embodiment of the invention is shown in the accompanying drawings in which—

FIGURE 1 is a flow diagram of the system embodying the features of this invention;

FIGURE 2 is a sectional view of the mixer section wherein the liquid materials are combined, diffused or reacted one with the other;

FIGURE 3 is an enlarged sectional view taken along the line 3—3 of FIGURE 2, and FIGURE 4 is an enlarged sectional view taken along the line 4—4 of FIGURE 2.

Description will now be made of the apparatus described in the drawing in the preparation of a mixed fertilizer containing a desired predetermined balance between nitrogen, introduced from anhydrous or aqueous ammonia solution, and phosphorus, introduced in the form of phosphoric acid, and the like phosphoric acids and salts thereof. The materials are combined by a proportioner which can be preset to control the amount of phosphoric acid and water to provide for a certain concentration of phosphorus in the final product. The ammonia component is added in an amount which is responsive to the pH of the mixture to provide for a neutral solution having a pH of about 6.8. These controls for measurement of each of the ingredients operate automatically to compensate for the changes in raw materials employed or conditions existing in operation which otherwise might normally vary the in-put of raw materials. Thus it becomes possible to maintain constant control for a continuous operation to produce a uniform product of predetermined chemistry. It will be understood that the system described can be employed for the combination of raw materials in other predetermined ratios for phosphorus and nitrogen or for the preparation of aqueous ammonia by dilution of anhydrous ammonia or for the admixture, diffusion or reaction of other chemical compounds to produce a liquid product capable of measurement and control.

For a general review first of the concepts of this invention as embodied in a commercial system, reference will be made to the flow diagram of FIGURE 1 for the production of a mixed liquid fertilizer. The numeral 10 represents a passage in the form of a pipe for the flow of phosphoric acid under pressure from a supply source (not shown) to a mixer device 12 which will hereinafter be described. A pump of conventional design (not shown) is embodied in the line for causing fluid to flow and a valve 14 is provided for opening and closing the passage in advance of an orifice plate 16 for measuring the flow of phosphoric acid.

The numeral 18 represents another passage in communication with a suitable pump for circulating ammonia under pressure from a suitable supply source to a portion of the mixer device 12 beyond the inlet for the phosphoric acid. A suitable shut-off valve 20 is also provided in the line in advance of an air controlled valve 22 which controls the rate of flow of ammonia.

The numeral 24 represents a third passage through which water is circulated under pressure, as by a pump (not shown) from a local supply source such as a well, to the inlet end of the mixer 12 in advance of the inlet for the phosphoric acid or ammonia. A shut-off valve 26 is provided in the water line in advance of an air controlled valve 28 which operates to regulate the flow of water. The valve is also provided in advance of an orifice plate 30 which measures the rate of flow of the water.

The source of supply for the phosphoric acid and ammonia may comprise stationary reservoirs but it is preferred to minimize requirements for storage space and equipment by making use of the tanker itself as a supply source for such materials thereby to enable portable units to be constructed for location adjacent trackage or a road over which the tankers may be moved. This is made possible by the continuous flow process which will hereinafter be described embodying equipment that can be assembled on a platform for transportation from station to station for the local supply of mixed fertilizer to farmers for use and which makes use of a local supply of water as one of the major ingredients to minimize the cost for shipment of a material which might otherwise be formed principally of this ingredient.

Both the phosphoric acid and water are continuously fed under pressure through their respective passages 10 and 24 for diffusion or admixture in the mixer device 12 in a predetermined ratio, as will hereinafter be described, for producing a concentrated solution of a mixed fertilizer. The ammonia is fed under pressure into a subsequent portion of the mixer device for combination and reaction with the phosphoric acid solution to produce an ammonium phosphate. The amount of ammonia is balanced to react with the phosphoric acid to produce a fertilizer having a pH within the range of 6–9 but which is preferably controlled to produce a neutral fertilizer having a pH of about 6.8.

The combined fluids are advanced through a passage 32 from the outlet of the mixer 12 into a spray head 34 of a reaction tank 36 where the materials are able to complete their reaction prior to circulation through a cooler section 40 for the extraction of some of the heat developed by the exothermic reaction. From the reactor tank 36, the material is circulated under pressure by the pump 42 through the passages 44 and 46 to the header 48. The header distributes the fluid for flow through the fins 50 which wind back and forth over the surface of banks of cooling plates 52 which are cooled on their outside by streams of water 54 sprayed onto the surface by spray pipes 56.

The ammonium phosphate solution flows from the outlets 58 of the cooling plates into headers 60 and to a collecting pipe 62 wherein the cooled material is separated at 64 into one portion which is recirculated through passages 66 for combination with the hot liquid coming from the mixer 12 prior to introduction into the reaction tank 36 while the remainder of the product is caused to flow through passage 68 to a storage tank or to a waiting tanker for local distribution and use.

Having briefly described the flow of materials, description will now be made of the various concepts of this invention which are embodied in the new and improved system for the continuous and efficient preparation of a mixed liquid fertilizer and for control to produce a balanced fertilizer of uniform composition and which operates further to avoid the development of conditions in operation which would lead either to the existence of dangerous conditions or loss of materials. The system described permits the utilization of less expensive and more desirable materials in manufacture thereby to produce a better and less expensive mixed liquid fertilizer.

Referring first to the controls for maintaining the constant balance between the amount of water mixed with phosphoric acid, it has been found best to maintain the desired ratio by adjustment of the flow rate of the water under pressure while maintaining the rate of flow of phosphoric acid as constant as possible. For this purpose, the orifice plate 16 is provided in the phosphoric acid line immediately in advance of entrance into the mixer 12 and a similar orifice plate 30 is provided in the water line 24.

When use is made of the orifice plates of the type described, displacement pressure cells are located on the upstream or downstream side of the orifices to record the pressure differential. The cells operate through an air line 70 to transmit changes in pressure due to changes in the rate of flow to a controller 72. As the pressure changes in response to the differential, a corresponding change is caused to be recorded in the controller which operates through line 74 to effect opening and closing movements of the air controlled valve 28 in the water line. The control is usually set for a predetermined pressure differential. The air controlled valve in the water line is made responsive to the ratio flow controller 72 to increase or decrease the rate of flow of water responsive to deviation in the flow rates of water and phosphoric acid. Suitable orifice plates or other sensing means for measuring the rate of flow are well known in the art and equivalent components may, if desired, be substituted for the orifice plates. Pressure responsive controllers are also known for operation of a valve to open and close the valve in response to results from the recorder.

The amount of ammonia added is calculated, in the preferred practice of this invention, to neutralize the phosphoric acid to produce a neutral fertilizer having a pH of about 6.8. Because of the wide variation in density of ammonia responsive to temperature changes, it is difficult to rely upon a volumetric means to control the rate of flow to maintain the desired ratio between the amount of ammonia and phosphoric acid. As a result, it is a further concept of this invention to embody a means for controlling the amount of ammonia added to the system in response to the pH of the final product. For this purpose, there is provided a pH controller 80 in the form of a Beckman pH meter or the like having its sensing point 82 located in the product line to measure the pH of the product flowing from the cooling section. The air control valve 22 in the ammonia line 18 is adapted to be operated by the pH recorder controller to open or close the valve in response to variation in pH of the product from a predetermined level.

The ammonia component can be incorporated into the system as an anhydrous material or in the form of a water solution such as ammonium hydroxide. When use is made of ammonia in solution in water it is preferred to make use of a composition containing less than 25 percent $NH_3$. While higher concentrations of $NH_3$ can be employed, solutions containing more than 25 percent require positive pressure to prevent vaporization of the ammonia. As the lower concentration, it is preferred to make use of a solution containing more than 10 percent by weight $NH_3$ and preferably the amount of ammonia in solution is maintained within the range of 16–25 percent by weight.

The phosphoric acid and ammonia combine in an exothermic reaction to produce an ammonium phosphate $(NH_3)PO_4$. In formulation of a concentrated fertilizer, such for example as a fertilizer containing 9.76 percent by weight $NH_3$, 44 percent by weight $H_3PO_4$, and 46.26 percent by weight water, as in the preparation of an 8–24–0 liquid fertilizer, the heat of reaction is sufficient to raise the temperature of the materials to above 200° F., depending somewhat upon the temperature of the ingredients. In this temperature range, there is a possibility of boiling off of ammonia vapors or other gases from the material and also of boiling off some of the liquid. Volatilization of ammonia or moisture raises dangerous conditions not only with respect to the loss of ammonia into the atmosphere but pressure conditions leading to explosion or the like also become possible. As a result, an important concept of this invention resides in the means rapidly to decrease the temperature of the materials immediately upon diffusion and combination one with the other in a continuous operation.

In accordance with the practice of this invention, the materials combined in the mixer 12 are immediately introduced into a reaction chamber with expansion from the elevated temperatures of reaction to about atmospheric pressure thereby to achieve, in part, a reduction in temperature. Simultaneously, a substantial proportion, such as about 75 percent, of the product from the cooling section is recirculated through the passages 66 for combination with the hot material issuing from the mixer 12 thereby immediately to achieve a reduction in temperature to a level below that at which vaporization or volatilization can take place in any substantial or uncontrolled amounts.

In practice, the material from the mixer issuing at about 210° F. is combined with about three times its weight of product liquid from the cooler at about 150–160° F. thereby to reduce the temperature of the liquid fed into the reaction chamber to about 180° F. At this temperature, release of ammonia vapors is minimized and evaporation of moisture is substantially eliminated. The fluid under pressure is expended through the valve 34 into the reaction chamber to achieve a still further reduction in temperature and to enable further reaction of components which might previously have escaped completion of the reaction. Usually the reaction between the ammonia and phosphoric acid will have been completed prior to flow from the mixer as will hereinafter be described so that the reaction tank serves mainly as a collector tank for admixture of the product material with fresh material for blending to produce a more uniform and controlled product for marketing.

The pump 42 raises the pressure of the fluid issuing from the reaction tank to the pressure of the fluid issuing from the mixer device 12 for circulation of the fluid under pressure to the header 48 and through the fins 50 of the cooling plates and back to the header 60 for collecting the cooled liquid which is then subdivided into one portion which is led to storage while the other is recirculated for combination with the fluid issuing at corresponding pressure from the mixer section.

Heat is extracted from the reacted fluid circulated through the fins 50 by means of a fluid, such as water 54, which is sprayed onto the outer walls of the cooling plates. For this purpose, pipes 84 are provided endwise of the cooling plates to extend crosswise of the plates with spray nozzles 56 directly inwardly to throw water onto the plates. In the illustrated modification, the spray pipes 56 are located to wet the lower half of the plates but it will be understood that the spray pipes may be located in other positions and that more than one bank of spray pipes may be employed or that the pipes may extend inwardly from the cross headers 84 through the space between the plates to wet the adjacent surfaces thereof. The water 86 drains from the plates downwardly into a collection tank 88 at the bottom side of the cooling housing for collecting the water for re-use, especially where water is at a premium in the more arid areas of the country. A pump 90 operates to withdraw the water from the pump through an inlet pipe 92 for circulation through passages 94 to the spray headers. The level of the water in the pump is controlled by a suitable float mechanism 96 to maintain the water at the desired level. Where water is not at a premium or where a plentiful supply of cold water is available, the water sprayed onto the tanks of cooling plates can be discarded by drainage from the equipment.

The temperature of the water may be reduced for cooling by evaporation which is caused to take place at an accelerated rate, if desired, by the circulation of air, as indicated by the arrows 97 through the housing 98 of the cooler section, as by means of suction fans 100 located within a chimney 102 at the upper end of the housing.

An important concept of this invention resides in the means and method for combining the water, phosphoric acid and ammonia for reaction in a mixer which minimizes the formation of volatile products or other gases and which causes reaction to take place in a manner and at a rate which produces a stable system of materials which otherwise might result in a product in which separation and settling would ordinarily take place. While the conditions and apparatus for combination of the ingredients will hereinafter be described in detail with reference to the combination of water, phosphoric acid and the combination of the water and phosphoric acid solution with ammonia, as in the continuous preparation of a mixed liquid fertilizer, it will be understood that the conditions and means described will have application as well for the combination of any two such materials in solution, such as anhydrous ammonia and water, or any two, three, four or more other chemical compounds in a fluid system which are intended to be brought together for reaction to produce a fluid product.

Referring now to FIGURES 2-4 of the drawings, the numeral 104 represents an elongate tubular member having a plurality of orifices 106 in the form of jets extending inwardly through the walls of the tubular member at an angle to position the inlet end at the outside upstream of the outlet end in the inner wall of the tubular member. A housing 108 surrounds the tubular member with the walls of the housing in spaced relation with the tubular member to provide an open space 110 all around therebetween. The housing 108 may be of any desired shape but it is preferred to form the housing of cylindrical section of larger dimension than the tubes and arranged concentrically therewith. The space 110 between the tubular member and the housing is formed with a sealing relation therebetween to enable fluid under pressure to be maintained within the open space 110 within the housing. The tubular member is formed with an inlet 112 at one end and an outlet 114 at the other. The inlet communicates with one of the passages through which an ingredient for admixture is caused to flow under pressure. The housing is provided intermediate its ends with an inlet 116 which communicates with the passage for the other fluid for flow of the fluid under pressure into the housing to keep the space 110 about the tubular member filled with fluid under pressure. As the first fluid flows under pressure axially from the inlet end to the outlet end through the tubular member an aspirator effect is created which smoothly and continuously draws the second fluid under pressure inwardly from the annular space 110 about the tubular member through the jets inclined in the direction of fluid flow for smooth flow of the second fluid into combination with the first.

When only two materials are to be combined only a one stage section of the type described will be required. When three materials are to be combined, a second station or section of the type described can be arranged in axial alignment with the first with the outlet end 114 of the first section in communication with the inlet end 118 of the second. When more than three materials are to be combined in sequence, the number of stations or sections can be correspondingly increased.

For purposes of control, an orifice plate 120 is arranged adjacent the inlets and outlets to provide for a pressure drop to control the flow of fluids through the tubular members. It is not necessary that the sections be in direct communication one with the other. It will be sufficient if some or all or none of the sections are combined. In fact, spacing may be required in some instances to enable a temporary pause for reaction of ingredients before further combination to incorporate additional materials. For purposes of manufacture, however, it is desirable to make use of orifice plates at the inlet as well as the outlet for each section. Where the sections are joined, as illustrated in FIGURE 2, a single orifice 120ª may be employed between the adjacent sections.

In the system described, the water pipe 24 is connected to cause the water at a pressure, for example at about 85 pounds per square inch, to flow through the orifice plate 120ᵇ into the inlet end 112 of the tubular member 104 for the first mixer step. The phosphoric acid pipe 10 is connected to the inlet 116 of the housing to introduce phosphoric acid at a pressure, such for example as 20 pounds per square inch. As the water under pressure flows axially through the tubing from the inlet end to the outlet end, it operates to draw phosphoric acid through the jet openings 106 for admixture with the water. The outlet end 114 of the first mixer section is in communication with an axially aligned orifice plate 120ª which leads into the tubular member 104ª of the second mixing section. The ammonia pipe 18 is connected to the inlet 116ª of the housing 108ª for introducing ammonium hydroxide solution into the housing under positive pressure, such for example as at about 80 pounds per square inch. Thus, as the phosphoric acid in water solution flows axially through the orifice plate 120ª and from the inlet end to the outlet end of the reaction tube 104ª, ammonium hydroxide is drawn through the jets 106ª from the housing into the tubular member for smooth combination with phosphoric acid solution under positive pressure.

When the ammonia is introduced into the phosphoric acid solution, the exothermic reaction that takes place automatically operates to cause substantial admixture but the operation is carried out under the conditions described without noticeable turbulence thereby to prevent gas formation which might otherwise lead to the development of dangerous conditions.

Combination or diffusion of the materials in the manner described under positive pressure appears to contribute importantly not only to the rate of reaction but to the character of the reaction where reaction not only takes place in considerably less time than would ordinarily be required for reaction of corresponding materials under batch conditions but the reaction product formed exhibits a greater stability than is capable of being developed with corresponding materials.

In the first place, the accelerated rate of reaction made possible by the combination of materials flowing together under positive pressure enables adaptation of the system to a continuous operation as compared to the batch processes heretofore employed.

Secondly, combination of the materials in continuous flow together under positive pressure makes it possible to achieve reaction at an accelerated rate without gas or vapor formation which otherwise would ordinarily accompany the combination of such materials thereby to provide for better control of the course of reaction and thereby greatly to improve the safety of the operation.

Thirdly, the combination of materials in continuous flow together for diffusion or reaction under positive pressure makes available a reaction product which appears to be substantially unlike products heretofore secured by the combination of corresponding materials. This can best be illustrated by the combination of materials in the system described to form a mixed fertilizer but it will be understood that flow together and reaction under positive pressure will have application as well to the combination of other liquid reactants.

In the manufacture of a mixed liquid ammonium phosphate, it has been found necessary in the past to make use of a relatively pure phosphoric acid which may be identified as furnace grade acid. Such purified acid markedly increases the cost of the product to the extent that a mixed liquid fertilizer was at an economic disadvantage by comparison with the dry mixes. Lower grade acids which were considerably less expensive and much more available were found to be objectionable because of the precipitation and settling out which occurred from the higher amounts of impurities present in the lower grade material which may be identified as red acid. For comparison purposes, a furnace grade acid having only traces of impurities costs about $27.00 per 100 pounds whereas red acid having as much as 4 percent by weight impurities costs about $6.90 per 100 pounds. Obviously the ability to make use of red acid would result in a considerable reduction in the cost of the liquid fertilizer to the end that an economic advantage could be enjoyed and fuller utilization could thus be made of a fertilizer in which the components could be made immediately available in the soil for use by the plants.

It has been found in accordance with the practice of this invention that when the materials are diffused and combined under pressure by continuous flow together under the conditions described, the reaction product that is formed with a red acid appears to be equally as stable as the product that is formed of a furnace grade acid. It appears that whatever insoluble materials are formed by the presence of the higher amount of impurities in the red acid remain uniformly suspended in the product to the extent that the problems heretofore encountered in settling out and precipitation are not evident in mixed fertilizer liquids prepared under the conditions described. The reason for this improvement has not been fully developed but it would appear that the immediate reaction which takes place under the pressure conditions and flow conditions described causes such insoluble impurities as are formed to be formed in a substantially nascent state in such fine particle form as to cause the product to appear as a clear or pure solution. This is to be distinguished from the large amount of settling out that would be experienced by the mixture of exactly the same materials in the same proportions and under the same temperature conditions in batch systems.

The improvements which are capable of being secured by the practice of this invention in the ability to make use of red acid instead of furnace acid contributes materially to the improvement in the character of the fertilizer liquid since the impurities in red acid lend materially to the value of the fertilizer that is formed. Since the acid represents more than 50 percent of the cost of the final product, it will be evident further that the ability to make use of the lower cost acid materially reduces the cost of the final product.

The differences between the reaction product capable of being secured by the practice of the concepts of this invention as compared to the type of reactions which have heretofore been employed can be further represented by the characteristics of a product which goes beyond a pH of 7.0. When the pH of the mixture exceeds this level, diammonium phosphate or dibasic ammonium phosphate is formed. This material is less soluble by a marked degree as compared to the tribasic phosphate with the result that the dibasic ammonium phosphate ordinarily precipitates from solution. However, when ammonia is incorporated with phosphoric acid in an amount to produce a product having a pH greater than 7.0 or an amount to produce a dibasic ammonium phosphate, little if any crystallization characteristic of the batch mixture of these materials is available in the final product even when the product is allowed to stand over a lengthy period of time. Where ammonia is present in such larger amounts, one ordinarily would expect free ammonia to rise from the hot solution formed by the system. The lack of the availability of free ammonia in the product formed by the practice of this invention has been demonstrated by the use of a scrubber attached to the reaction vessel. No signs of free ammonia were evidenced in the system embodying the practice of this invention. This is believed to be indicative of a difference between the reaction products secured by the practice of the concepts of this invention as compared with other means for combining materials.

The angular relationship of the orifices or jets 106 and 106a extending through the tubular member of the reaction vessel can be varied over a fairly wide range depending mostly upon the viscosity of the materials. It has been found that the more viscous the materials the steeper the angle. It has been found that the angular relation of the jets should be maintained within the range of 20–60 degrees and preferably within the range of 22½–45 degrees. Deviation of the angular relationship of the jets below 20 degrees or beyond 60 degrees tends to reduce the advantage of the venturi action for drawing the one fluid into the other and the possibility for shock conditions for reaction develops.

The length of the tube is unimportant though it is desirable to balance the length with the rate of reaction, the rate of flow of materials and the amount of through-put to achieve the substantial completion of the reaction before clearance of the reaction section by the combined liquids. If the tubing is too short, one tends to secure a hammer action and the reaction will not be carried to completion. Lengths beyond the minimum may be employed though not necessary when the length is sufficient for completing the reaction. The dimension of the jets may also be varied depending upon the amount of through-put. It is preferred to make use of openings as small as possible. The smaller the openings, the more openings that are required for a given through-put of materials.

The pressure conditions existing in the reaction unit can be varied over a fairly wide range from slightly above atmospheric pressure to high pressure limited only by the ability of the structural material to withstand the pressures of operation. It will be understood, however, that often times higher pressures can be used to maintain vapors in a condensed state in the reaction thereby not only to accelerate the rate of reaction but to obviate loss of components which otherwise escape as a gaseous phase or which, in the interim, might present a dangerous condition in the operation of the process.

It will be apparent from the foregoing that I have briefly described a means and apparatus for the continuous flow of fluid reactants one into the other for accelerated reaction to produce an improved product which has special application to the manufacture of a mixed fertilizer.

It will be understood that the system described may be utilized to combine anhydrous ammonia with water to produce aqueous ammonium hydroxide as a liquid fertilizer for distribution. In such event, only one mixer station would be employed and recirculation through a reactor section could be avoided since an exothermic reaction capable of developing high temperatures would not be present.

It will be understood that the system described may be adapted for the diffusion, combination and reaction of other liquid chemicals in a predetermined sequence to produce an improved chemical product having greater stability and which can be varied with respect to impurities and ingredients over a greater range by comparison with the batch systems for combining such materials.

It will be further understood that other changes may be made in the details of construction, arrangement and operation without departing from the spirit of the invention, especially as defined in the following claims.

I claim:
1. The method of producing a mixed liquid fertilizer containing nitrogen and phosphorus in a predetermined ratio and in a continuous operation, comprising
    (a) feeding phosphoric acid under positive pressure in a continuous stream at a substantially uniform rate to a reaction zone,
    (b) feeding water in a continuous stream at a controllable rate and under positive pressure to the reaction zone for admixture with the phosphoric acid in a predetermined ratio to provide for a predetermined concentration of phosphorus in solution in the system,
    (c) feeding liquid ammonia in a continuous stream at a rate controlled by the pH of the final product and under positive pressure to the reaction zone for reaction with the diluted phosphoric acid solution to produce ammonium phosphate,
    (c') expanding the mixture of materials into a reaction vessel for completion of the reaction,
    (c") recompressing the mixture after reaction has been completed,
    (d) extracting heat of reaction from the reaction product issuing from the reaction vessel to reduce the temperature of the reaction product to below the temperature for volatilization of any of the components, and
    (e) separating the cooled reaction product into a product portion and a portion which is recycled through the system, the said extracting of the heat of reaction being accomplished at least in part by admixing the recycled portion with the partially reacted mixture issuing from the reaction zone and prior to expansion into the reaction vessel for immediate reduction in temperature.

2. The method of producing a mixed liquid fertilizer containing nitrogen and phosphorus in a predetermined ratio and in a continuous operation, comprising
    (a) feeding phosphoric acid under positive pressure in a continuous stream at a substantially uniform rate to a reaction zone,
    (b) feeding water in a continuous stream at a controllable rate and under positive pressure to the reaction zone for admixture with the phosphoric acid in a predetermined ratio to provide for a predetermined concentration of phosphorus in solution in the system,
    (c) feeding liquid ammonia in a continuous stream at a rate controlled by the pH of the final product and under positive pressure to the reaction zone for reaction with the diluted phosphoric acid solution to produce ammonium phosphate,
    (d) controlling the rate of feed of ammonia to provide a reaction product having a neutral pH,
    (d') expanding the mixture of materials into a reaction vessel for completion of the reaction,
    (d") recompressing the mixture after reaction has been completed,
    (e) extracting heat of reaction from the reaction product issuing from the reaction vessel to reduce the temperature of the reaction product to below the temperature for volatilization of any of the components, and
    (f) separating the cooled reaction product into a product portion and a portion which is recycled through the system, the said extracting of the heat of reaction being accomplished at least in part by admixing the recycled portion with the partially reacted mixture issuing from the reaction zone and prior to expansion into the reaction vessel for immediate reduction in temperature.

3. The method as claimed in claim 1 in which the flow rate of water is controlled responsive to the change in the flow rate of the phosphoric acid solution to maintain a constant ratio between the phosphoric acid and water.

4. The method as claimed in claim 1 in which the flow rate of the ammonia is controlled in response to the pH of the reaction product subsequent to issuance from the reaction zone.

5. The method as claimed in claim 1 in which the temperature of the reaction product immediately following issuance from the reaction zone is maintained below 180° F.

6. The method as claimed in claim 1 in which the ammonia is introduced as anhydrous ammonia.

7. The method as claimed in claim 1 in which the ammonia is introduced as ammonium hydroxide having $NH_3$ present in amounts greater than 10 but less than 25 percent by weight.

8. The method as claimed in claim 1 in which the ammonia is added in an amount to produce a reaction product having a pH of about 6.8.

9. The method as claimed in claim 1 in which the reaction between the diluted phosphoric acid and ammonia is carried out under positive pressure thereby to accelerate the rate of reaction while militating against the formation of volatiles.

10. The method as claimed in claim 1 in which the heat of reaction is additionally extracted by heat exchange by circulating the reaction product through water cooled plates.

11. The method as claimed in claim 1 in which about 50–75 percent of the cooled reaction product is recirculated for combination with the reaction product issuing from the reaction zone.

References Cited in the file of this patent

UNITED STATES PATENTS

| 2,917,380 | Franklin | Dec. 15, 1959 |
| 2,952,531 | Bresee | Sept. 13, 1960 |
| 2,969,280 | Peck | Jan. 24, 1961 |